United States Patent [19]

Nakate et al.

[11] 4,221,683

[45] Sep. 9, 1980

[54] LOW TEMPERATURE CURING HIGH SOLID COATING COMPOSITION

[75] Inventors: Yasusi Nakate; Hiroshi Iwai; Kiyoshi Nanishi, all of Hiratsuka, Japan

[73] Assignee: Kansai Paint Co., Ltd., Japan

[21] Appl. No.: 886,898

[22] Filed: Mar. 15, 1978

[30] Foreign Application Priority Data

| Sep. 28, 1977 | [JP] | Japan | 52-116389 |
| Sep. 30, 1977 | [JP] | Japan | 52-117652 |
| Oct. 3, 1977 | [JP] | Japan | 52-118886 |
| Oct. 3, 1977 | [JP] | Japan | 52-118887 |
| Feb. 13, 1978 | [JP] | Japan | 53-15261 |

[51] Int. Cl.$^2$ .................. C08L 33/14; C08L 61/32
[52] U.S. Cl. .................. 260/15; 260/17 R; 260/17.3; 260/39 R; 525/162; 525/163
[58] Field of Search ............ 260/851, 856, 855, 15, 260/17.3; 525/162

[56] References Cited

U.S. PATENT DOCUMENTS

| 3,082,184 | 3/1963 | Falgiatore et al. | 260/856 |
| 3,352,806 | 11/1967 | Hicks | 260/856 |
| 3,773,710 | 11/1973 | Victorius | 260/856 |
| 4,027,066 | 5/1977 | Victorius | 260/856 |
| 4,083,892 | 4/1978 | Sekmakas | 260/856 |

*Primary Examiner*—Wilbert J. Briggs, Sr.
*Attorney, Agent, or Firm*—Ostrolenk, Faber, Gerb & Soffen

[57] ABSTRACT

A low temperature curing high solid coating composition which comprises: (I) acrylic resin having a glass transition temperature of 20° to −50° C. and a hydroxyl value of 40 to 280, which is obtained by copolymerizing the monomer mixture comprising (a) acrylic ester and/or methacrylic ester, and if necessary, (b) acrylic acid or methacrylic acid, (II) amino-formaldehyde resin which is etherified with a monohydric alcohol, (III) an acid catalyst, and if necessary, (IV) cellulose derivatives and/or (V) metallic coordination compounds of titanium, zirconium and/or aluminium.

The coating composition of the invention is characterized in that it has a high solid content and is cured at a low temperature and the obtained coating film has quite excellent properties of durability, hardness and chemical resistance.

11 Claims, No Drawings

LOW TEMPERATURE CURING HIGH SOLID COATING COMPOSITION

BACKGROUND OF THE INVENTION (1) Field of the Invention

This invention relates to a low-temperature curing coating composition. More particularly, the invention relates to a low-temperature curing amino-acrylic resin coating composition of a high solid type.

(2) Description of Prior Art

In the industrial fields of automobile manufacture, automobile repairing and other manufactures of industrial equipment, steel-made furniture, non-metallic products and so forth, several properties are required of the coating compositions to be used in view of the reduction of labour and energy and the improvement of safety to human body, in recent years.

For these purposes, acrylic lacquer, acrylic enamel, acryl-urethane resin paint and amino-alkyd resin paint have been hitherto used widely.

In connection with the acrylic lacquer, however, the coating must be done repeatedly for many times and the polishing with a polishing compound is required, so that the acrylic lacquer is not satisfactory in view of the reduction of labour and the environmental pollution caused by evaporation of a large amount of organic solvent. Also, the acrylic enamel is not satisfactory with respect to the film properties such as drying property, hardness, solvent resistance and the retention of gloss. Further, the acryl-urethane resin paint is undesirable in view of safety since it contains isocyanate compounds injurious to health. Furthermore, since the baking temperature of the aminoalkyd resin paint is high (for example, at 140° to 160° C. for 20 minutes), it cannot be regarded as satisfactory in view of the requirement of low-temperature curing (the term "low-temperature" herein referred to means the range of 60° to 100° C.).

In order to meet the requirements of the reduction of labour and energy and the improvement of safety, it is necessary to make the coating composition high-solid and low-temperature curable. Especially, the desirable coating composition must be cured at a temperature from 60° to 100° C., more preferably from 60° to 80° C. for 20-30 minutes, which is lower than the temperature commonly regarded as low temperatures.

In the case that a high-solid acrylic resin coating composition is prepared in the prior art, the molecular weight of the acrylic resin used is reduced by the using of chaintransfer agents or by increasing the use of polymerization catalyst. The low molecular weight acrylic resin thus obtained is employed to increase the solid content of a coating composition. (cf. for example, Journal of the Japan Society of Colour Material, Vol. 48, No. 11, pages 677-685, 1975) The acrylic resins can be classified according to their functional groups into methylolacrylamide type, hydroxy type, carboxyl type and glycidyl type. The hydroxy type is most widely used in combination with melamine resin and, when it is applied, the coating film is baked at 140° to 150° C. for about 30 minutes. However, since the molecular weight of this acrylic resin is low, the durability of obtained coating film is not satisfactory. Further, there is known a method to add an acid catalyst so as to lower the baking temperature of amino acrylic resin coating composition, however, when the properties of the obtained coating films are taken into consideration, the limit of baking condition is 100° C. for 30 minutes.

The inventors of the present application have carried out wide and extensive studies in order to obtain a novel low-temperature curing and high-solid coating composition. As a result, the present invention has been accomplished through the following measures, without lowering the molecular weight of acrylic resin.

That is, (1) the glass transition temperature of acrylic copolymer is brought to 20° C. to −50° C. When the glass transition temperature is low, the solution viscosity of a resin can be made low, so that the preparation of a high-solid composition becomes possible. Further, the marvel is that the lower the glass transition temperature of an acrylic copolymer is, the higher the hardness of coating film becomes. This fact has been found out by us and the conditions for this fact are quite important for the coating composition of the present invention.

In the conventional coating compositions, the glass transition temperatures of acrylic copolymers were generally high in the range of 20° C. to 105° C., and it has been regarded that when a vehicle having a very low glass transition temperature as the acrylic copolymer of the present invention is used, the hardness of obtained coating film becomes low and the surface of coating film remains sticky. Therefore, the use of such vehicle has never been tried. From this point of view, the coating composition of the present invention is a novel one.

(2) It is necessary that the hydroxyl value of the above acrylic copolymer is in the range of 40 to 280.

The hydroxyl valve has influences on the hardness and the gasoline resistance. Especially when the glass transition temperature is low, the effect of hydroxyl value is quite large. Therefore, this hydroxyl value is also an important limiting factor for the coating composition of the present invention. Except the coating composition using isocyanate as a curing agent, there is not used acrylic resin having such a high hydroxyl value as that of the acrylic copolymer of the present invention. Much more, the coating composition of the present invention is quite novel in the compositions combined with aminoplasts.

(3) It is necessary that the alcohols used for the etherification of amino-formaldehyde resin are low carbon monohydric alcohols having 1 to 4 carbon atoms. This depends upon the fact that ether interchange reaction occurs mainly rather than deformaldehyde reaction at low temperatures and the aminoformaldehyde resin etherified with low carbon monohydric alcohols is subject to the ether interchange reaction.

(4) An acid catalyst is employed. By the use of the acid catalyst, the low temperature curing can be facilitated.

Further, in the field of non-metallic products, especially in the production of outdoor plywood, a durable and low-temperature curing coating composition has long been desired for and the coating composition of the present invention also meets such requirement forming a quite weather resistant and hard coating films.

BRIEF SUMMARY OF THE INVENTION

It is, therefore, the primary object of the present invention to provide a novel coating composition which is cured at low temperatures.

Another object of the present invention is to provide an amino acrylic resin coating composition which has a high solid content.

A further object of the present invention is to provide a coating composition from which the coating films having excellent film properties can be formed.

Still a further object of the present invention is to provide a coating composition which can be applied to a wide variety of articles including non-metallic products.

In accordance with the present invention, the low-temperature curing high solid coating composition comprises:

(I) 100 parts by weight of acrylic resin having a glass transition temperature of 20° to −50° C. and a hydroxyl value of 40 to 280, which is obtained by copolymerizing the monomer mixture comprising (a) acrylic esters having an alkyl group having 1 to 12 carbon atoms and/or methacrylic esters having an alkyl group having 1 to 12 carbon atoms, and if desired (b) less than 15% by weight of acrylic acid or methacrylic acid.

(II) 5 to 160 parts by weight of amino-formaldehyde resin which is etherified with a monohydric alcohol having 1 to 4 carbon atoms;

(III) 0.5 to 6.0 parts by weight [to 100 parts by weight of solid content of the above resin mixture of (I) and (II)] of acid catalyst; and if necessary, (IV) cellulose derivatives; and/or (V) metallic coordination compounds of titanium, zirconium and aluminium.

DETAILED DESCRIPTION OF THE INVENTION

The reason for the low-temperature curing of the coating composition of the present invention is supposed as follows.

In the conventional blend type acrylic resin coating composition using an aminoplast as a cross linking agent, the curing is mainly accomplished by the reaction (140° C. or above) of carboxyl groups with the aminoplast and the reaction (120° C. or above) of hydroxyl groups with the aminoplast. In the coating composition of the present invention, the carboxyl groups of the acrylic copolymer act like a catalyst (almost no relation to the cross linking reaction), so that the ether interchange reaction between the hydroxyl groups of acrylic resin and the alkyl ether groups of the aminoplast, and the self-condensation of aminoplast are caused to occur in the component vehicle of the coating composition. As the result, it is considered that the condensed highly polymeric aminoplast phase and the acrylic copolymer phase are uniformly mixed together in the state of mixed phases, thereby forming a coating film. The hydroxyl groups in the acrylic copolymer is cross-linked with the hydroxyl groups of the aminoplast in the mixed phases. Further, it is considered that the mixed phases become more uniform when the glass transition temperature of the acrylic copolymer is low. Also, the glass transition temperature of the coating film obtained from the coating composition of the present invention is about 60° C. and the coating film shows the same film performance as that of a cross linked coating film.

There has never been considered that the acrylic resin-aminoplast coating composition can be cured at a low temperature of 60° to 80° C. forming the coating films of practical value. In this regard, the coating composition of the present invention has developed a new site in the paint field and it will be understood that the present invention is industrially valuable in view of the reduction of energy.

Further, in the conventional practice, the coating composition is made high solid generally by reducing the molecular weight. However, if the glass transition temperature of acrylic copolymer is lowered below 20° C. in this method, excellent film properties cannot be expected and the baking at a high temperature is required. In the acrylic copolymer of the present invention, the solid content of the solution can be much raised without lowering the molecular weight, with a low glass transition temperature and a high hydroxyl value.

Furthermore, since a durable coating film can be formed by low temperature baking with using the coating composition of the present invention, the coating composition can be applied to the surfaces of thermally weak substrates such as wood, plywood, calcium silicate plates, slates and cement products, which have been difficulty finished by coating in the conventional art. Therefore, with the use of the coating composition of the present invention, the above materials can be used as materials for exterior use and new utilities for such purposes will be developed. Still further, the coating composition of the present invention is also advantageous in view of the hygienic safety. That is, for example, in the conventional amino type coating composition, the curing is accomplished mainly by deformaldehyde reaction, while in the coating composition of the present invention, the curing is brought about mainly by the ether interchange reaction and the self-condensation of amino-formaldehyde. Therefore, the irritating formalin odor is very little.

In combination with the coating composition of the present invention, it is possible to use cellulose derivatives such as cellulose nitrate and cellulose acetate butyrate, and by using them, a coating composition having good coating workability in the metallic finish and set to touch property can be obtained.

Further, in order to improve the low-temperature curing property of the coating composition of the present invention, metallic coordination compounds such as those of titanium, zirconium and aluminium may be added to the composition.

In the following, the coating composition of the present invention will be further described in detail.

The acrylic resin used for the coating composition of the present invention is prepared by using an acrylic ester having an alkyl group having 1 to 12 carbon atoms and/or a methacrylic ester having an alkyl group having 1 to 12 carbon atoms. Exemplified as such acrylic esters and methacrylic esters are methyl methacrylate, ethyl methacrylate, butyl methacrylate, isobutyl methacrylate, methyl acrylate, ethyl acrylate, butyl acrylate, isobutyl acrylate, 2-ethylhexyl acrylate, lauryl methacrylate, 2-ethylhexyl methacrylate, 2-hydroxyethyl methacrylate, 2-hydroxyethyl acrylate and hydroxypropyl acrylate. It is to be noted that the methacrylic esters and/or acrylic esters for the acrylic resin of the present invention are not restricted to the above-mentioned monomers. These methacrylic esters and/or acrylic esters should be combined so as to bring the glass transition temperature of the obtained copolymer to 20° C. to −50° C. and the hydroxyl value to 40 to 280.

Further, if desired, acrylic acid or methacrylic acid monomer may be combined with above-mentioned monomer in the amount of less than 15% by weight. The use of acrylic acid or methacrylic acid improves the curing property and the adherence to old coating films of the coating composition. When the quantity of the acid exceeds 15% by weight, the storage stability after the preparation of coating composition becomes worse and further, the water resistance also becomes worse, so that the use of too much quantity thereof should be avoided.

Furthermore, in like manner as the commonly known acrylic resins, polymerizable vinyl monomers such as styrene, acrylamide and vinyltoluene may be used together with the acrylic resin that is employed in the present invention. When they are used, not more than 50% by weight, more preferably not more than 35% by weight of the acrylic ester and/or methacrylic ester may be substituted with the above polymerizable vinyl monomers.

The molecular weight cannot be disregarded in view of the durability, hardness, water resistance, and low-temperature curing property of the coating film.

In order to maintain a desirable properties, the molecular weight may be within the range of about 5,000 to 50,000, more preferably about 10,000 to 40,000, when it is measured by gel permeation chromatography (GPC). If the molecular weight is lower than about 5,000, the mechanical strength, durability and set to touch property of the coating film become unsatisfactory, on the other hand, if the molecular weight exceeds about 50,000, the adherence to old coating films and coating workability become worse and further the formation of high solid composition become difficult.

The copolymerization for the preparation of the above-described acrylic resin can be carried out by the commonly known method.

The glass transition temperature may be determined by the empirical formula: $1/Tg = \Sigma Wn/Tgn$, in which the symbol Tg means the glass transition temperature (absolute) of the copolymer, Wn means the parts by weight of the monomer n, and Tgn means the glass transition temperature (absolute) of the monomer n. The hydroxyl value is measured according to JIS K 1557-1970 6.4 (Japanese Industrial Standards K 1557 of June 4, 1970). The regulation of the hydroxyl value can be done with the above-described monomers containing hydroxyl groups. The hydroxyl groups in the acrylic copolymer is cross-linked with the hydroxyl groups of the aminoplast, so that it is necessary that the hydroxyl value of the acrylic copolymer is high since the hydroxyl groups corresponding to those in the aminoplast is required.

The amino group containing compounds for the aminoformaldehyde resin which is used in combination with the acrylic copolymer, are exemplified by melamine, urea, benzoguanamine, acetoguanamine, steroguanamine and spiroguanamine. The alcohols which are used for the etherification of the aminoformaldehyde resin are represented by the chemical formula: ROH, that is, monohydric alcohols having $C_1$ to $C_4$ hydrocarbon groups of methyl, ethyl, propyl, isopropyl, butyl and isobutyl groups as the symbol R.

In the preparation of the coating composition of the present invention, the compounding ratio of the acrylic resin and the amino-formaldehyde resin is such that 5 to 160 parts by weight of the amino-formaldehyde resin is used to 100 parts by weight of the acrylic resin. The desirable range of the use of amino-formaldehyde resin is 15 to 120 parts by weight.

When the quantity of the amino-formaldehyde resin is less than 5 parts by weight, a sufficiently cross-linked coating film cannot be obtained since the quantity of the amino-formaldehyde resin is too small with regard to the hydroxyl value of the acrylic resin. On the other hand, when more than 160 parts by weight of the amino-formaldehyde is used, the coating film becomes hard to excess which is not desirable in view of the mechanical properties since the coating film becomes brittle.

Exemplified as the acid catalysts used for the coating composition of the present invention are Lewis acids such as hydrochloric acid, phosphoric acid, dimethyl phosphate, triethyl phosphate, tricresyl phosphate, triphenyl phosphate, tributyl-phosphate, trimethyl phosphate, xylenesulfonic acid, toluenesulfonic acid, sulfanilic acid, sulfobenzoic acid, naphthalenesulfonic acid, benzenesulfonic acid, sulfosalicylic acid, ethanesulfonic acid, aminophenolsulfonic acid and aminobenzenesulfonic acid. The acid catalysts give the coating composition low temperature curing property.

The addition quantity of the catalyst is preferably in the range of 0.5 to 6.0 parts by weight to 100 parts by weight of solid content of the mixed resin of the acrylic resin and the amino-formaldehyde resin.

In the case that the quantity of the catalyst is smaller than 0.5 part by weight, the low temperature curing property is hardly obtained, while if the quantity of the catalyst exceeds 6.0 parts by weight, undesirable results are brought about in that the gelation of the coating composition becomes liable to occur rapidly and, when the coating composition is applied to iron plates, the iron plates become liable to rust.

The quantity of cellulose acetate butylate or cellulose nitrate which is used as an auxiliary vehicle in the present invention, is preferably in the range of 1 to 15 parts by weight to 100 parts by weight of solid content of the mixed resin of the acrylic resin and the amino-formaldehyde resin. When the addition quantity is less than 1 part by weight, the effects in the coating workability and the set to touch drying property can hardly be expected, on the other hand, if the addition quantity exceeds 15 parts by weight, the physical property becomes worse, and if the cellulose nitrate is used, the colour of obtained coating film is seriously changed by heat and ultraviolet rays.

Exemplified as the internal catalysts of the metallic coordination compounds of titanium, zirconium and aluminium used in the present invention are titanium lactate, titanium ammonium lactate, titanium acetyl acetonate, titanium triethanol aminate, titanium octylene glycolate, titanium triisostearate, titanium diacrylate, zirconium ammonium lactate, zirconium acetyl acetonate, and aluminium alcoholate. The addition quantity of them is preferably in the range of 0.1 to 20 parts by weight to 100 parts of solid content of the mixed resin of the acrylic resin and the amino-formaldehyde resin. When the addition quantity is less than 0.1 part by weight, the effect as an internal catalyst cannot be expected, while with the more than 20 parts by weight of the metallic coordination compound, the storage stability of the coating composition becomes poor and the change of colour by heat and ultraviolet rays is caused to occur, and therefore it is not desirable.

If necessary, the coating composition of the present invention can be compounded with organic or inorganic coloring pigments and fillers.

Further, the coating composition can be applied to the surfaces of articles by means of an air spray, airless spray, electrostatic coating, roll coater, and curtain-flow coater.

Since the obtained coating film is quite tough and excellent in hardness, solvent resistance, imprint resistance, high build and durability, the coating composition of the present invention has a high utility value as an industrial material. Further, the curing of the coating composition of the present invention can be baked at a temperature above 100° C. without any undesirable result.

In the following, the present invention will be further described with reference to several examples. It is to be noted, however, that those skilled in the art can modify the examples within the scope of the present invention and the present invention is by no means restricted to the following examples.

Incidentally, the terms parts and % used in the preparation examples and other examples are by weight unless otherwise indicated.

PREPARATION EXAMPLES OF RESIN VARNISH

Preparation Example 1 (Acrylic resin)

To a 300 ml four-neck flask equipped with a thermometer, stirrer, cooler and dropping funnel were added 50 parts of xylene and 17 parts of butyl acetate, and the air in the flask was displaced by nitrogen gas. After that, the contents of the flask were maintained at a temperature below 30° C. The dropping funnel was fed with mixed monomers consisting of 2.0 parts of azoisobutyronitrile, 60.0 parts of n-butyl acrylate, 10.0 parts of styrene and 30.0 parts of 2-hydroxyethyl acrylate and the mixture was then dropped over 3 hours, in which the contents of the flask were kept at 112° C. After the dropping, the contents of the flask were kept at that temperature. Then, 0.5 part of azoisobutylvaleronitrile and 10 parts of butyl acetate were dropped and the reaction was further continued for about 3 hours at 112° C. After the reaction, the contents of the flask was cooled to 80° C. and the solid content was adjusted to 60% with using xylene to obtain an acrylic resin of a polymerization rate of 100%, a molecular weight by GPC of about 30,000, a viscosity of N (Gardner viscometer/25° C., the same shall apply hereinafter) at the solid content of about 60%, a hydroxyl value of 145 and a glass transition temperature of about −37° C.

PREPARATION EXAMPLES 2-15

With the formulae of monomers shown in the following Table 1, acrylic resins were prepared in like manner as the foregoing Preparation Example 1.

Table 1

| Preparation Examples<br>Materials (parts) | 2 | 3 | 4 | 5 | 6 | 7 | 8 | 9 |
|---|---|---|---|---|---|---|---|---|
| Methyl methacrylate | 5.0 | | 10.0 | 5.0 | | | 17.0 | 5.0 |
| Ethyl acrylate | | 10.0 | | | | 10.0 | | 40.0 |
| n-Butyl acrylate | 65.0 | 45.0 | | 45.0 | 60.0 | | 46.0 | |
| n-Butyl methacrylate | | 11.0 | | | | 10.0 | | |
| Lauryl methacrylate | 10.0 | | | | | 50.0 | | |
| Styrene | | 1.0 | 13.0 | | 5.0 | | 17.0 | |
| Acrylic acid | | | | | | | 10.0 | 10.0 |
| Methacrylic acid | | | | | | | | |
| 2-Hydroxyethyl acrylate | | 33.0 | 20.0 | | 25.0 | 30.0 | | 15.0 |
| 2-Ethylhexyl acrylate | 10.0 | | 57.0 | 33.0 | 10.0 | | | |
| 2-Hydroxyethyl methacrylate | 15.0 | | | 17.0 | | | 10.0 | |
| Azoisobutylvaleronitrile | 0.5 | 0.5 | 0.5 | 0.5 | 0.5 | 0.5 | 0.5 | 0.5 |
| Azoisobutyronitrile | 2.0 | 1.5 | 0.5 | 1.0 | 2.5 | 1.5 | 2.0 | 2.0 |
| Glass transition temp. (°C.) | −48 | −47 | −21 | −35 | −43 | −34 | 12 | 20 |
| Hydroxyl value | 72 | 160 | 95 | 78 | 120 | 145 | 44 | 72 |
| Molecular weight | 12000 | 14000 | 18500 | 15500 | 10500 | 14000 | 30000 | 12000 |
| Acid value | | | | | | | 76 | 77 |
| Varnish viscosity at 60 % of solid content | A | I | E | G | D | H | Z | X |

| Preparation Examples<br>Materials (parts) | 10 | 11 | 12 | 13 | 14 | 15 |
|---|---|---|---|---|---|---|
| Methyl methacrylate | | | 34.0 | | | 33.0 |
| Ethyl acrylate | | | | | | 34.0 |
| n-Butyl acrylate | | 49.0 | 20.0 | 60.0 | 60.0 | 12.0 |
| n-Butyl methacrylate | | | | | | |
| Lauryl methacrylate | 27.0 | | | | | |
| Styrene | 20.0 | 10.0 | | 20.0 | 10.0 | 20.0 |
| Acrylic acid | 15.0 | 2.0 | | 3.0 | 1.3 | 1.0 |
| Methacrylic acid | | | 1.3 | | | |
| 2-Hydroxyethyl acrylate | 13.0 | 40.0 | 50.0 | 17.0 | 29.0 | |
| 2-Ethylhexyl acrylate | 25.0 | | | | | |
| 2-Hydroxyethyl methacrylate | | | | | | |
| Azoisobutylvaleronitrile | 0.5 | 0.5 | 0.5 | 0.5 | 0.5 | 0.5 |
| Azoisobutyronitrile | 2.0 | 2.0 | 2.0 | 2.0 | 2.0 | 2.0 |
| Glass transition temp. (°C.) | 5 | −46 | −35 | −34 | −45 | 60 |
| Hydroxyl value | 60 | 193 | 240 | 82 | 140 | |
| Molecular weight | 12000 | 5000 | 12000 | 13000 | 15000 | 20000 |
| Acid value | 116 | 8 | 10 | 21 | 10 | 8 |
| Varnish viscosity at 60 % of solid content | X | I-J | N | J | Q | $Z_1$ |

PREPARATION EXAMPLE 16
(Amino-formaldehyde resin)

A reaction vessel was fed with 126 parts of melamine, 525 parts of isobutanol-formalin (concentration of formaldehyde: 40%), 625 parts of isobutanol and 56 parts of pure water, and the contents were refluxed by heating for 3 hours to perform dehydration. Then, the excess isobutanol was replaced with xylene, thereby obtaining an amino-formaldehyde resin.

The solid content of thus obtained solution was 80% and the Gardner-Holdt viscosity was P.

PREPARATION EXAMPLE 17
(Amino-formaldehyde resin)

A reaction vessel was fed with 126 parts of melamine, 250 parts of n-butyl alcohol, 520 parts of n-butanol formalin (concentration of formaldehyde: 40%) and 0.01 part of phthalic anhydride, and the contents were refluxed by heating for 3 hours to perform dehydration. Then, the excess n-butanol was replaced with xylene to obtain an aminoformaldehyde resin.

The solid content of thus obtained solution was 70% and the Gardner-Holdt viscosity was E.

EXAMPLE 1

Into 35 parts of the acrylic resin prepared in the foregoing Preparation Example 1, 125 parts of titanium dioxide (made by Teikoku Kako Co., Ltd. R-500), 8 parts of methyl ethyl ketone, 10 parts of xylene and 1 part of a dispersing agent (trademark: Reybo #3, made by Raybo Chemical Co., Ltd.), were added and they were dispersed together by a pebble mill until the dispersion particles become 10 micron in diameter. Immediately after that, 11 parts of the above acrylic resin was added and the pebble mill was further operated for about 30 minutes so as to stabilize the product. After that, 120 parts of the above acrylic resin, 10 parts of methyl ethyl ketone, 2 parts of xylene and 32 parts of the amino-formaldehyde resin obtained in Preparation Example 16 were uniformly mixed into the above pebble mill base with stirring, thereby preparing a coating composition. Further, 4 parts of 40% p-toluenesulfonic acid solution (in ethanol) was uniformly mixed into the composition with a stirrer.

The thus obtained coating composition was applied to the surfaces of mild steel plate (300×90×0.8 mm) to form dry coating film of 35 to 45 microns in thickness. The solid content of the coating composition was 75.0%. After it was left for about 15 minutes in a room, the coating film was cured at the conditions indicated in Table 3 to obtain test piece. The test results are shown also in Table 3.

EXAMPLES 2 TO 17 AND COMPARATIVE EXAMPLE

In like manner as Example 1, coating compositions were prepared with the compounding ratios shown in Table 2. Test plates were prepared in like manner as Example 1 by applying the coating compositions to mild steel plates. Then the film performance tests were carried out, the results of which are shown in the following Table 3.

Table 2

| Test Pieces (parts) Raw Materials | Examples 2 | 3 | 4 | 5 | 6 | 7 | 8 | 9 | 10 | 11 | 12 | 13 | 14 | 15 | 16 | 17 | Comp. Ex. |
|---|---|---|---|---|---|---|---|---|---|---|---|---|---|---|---|---|---|
| Prep. Ex. 2 | 166 | | | | | | | | | | | | | | | | |
| Prep. Ex. 3 | | 166 | | | | | | | | | | | | | | | |
| Prep. Ex. 4 | | | 166 | | | | | | | | | | | | | | |
| Prep. Ex. 5 | | | | 166 | | | | | | | | | | | | | |
| Prep. Ex. 6 | | | | | 166 | | | | | | | | | | | | |
| Prep. Ex. 7 | | | | | | 166 | | | | | | | | | | | |
| Prep. Ex. 8 | | | | | | | 431 | | | | | | | | | | |
| Prep. Ex. 9 | | | | | | | | 166 | | | | | | | | | |
| Prep. Ex. 10 | | | | | | | | | 166 | | | | | 160 | | | |
| Prep. Ex. 11 | | | | | | | | | | 166 | | | | | 166 | | |
| Prep. Ex. 12 | | | | | | | | | | | 166 | | | | | | |
| Prep. Ex. 13 | | | | | | | | | | | | 166 | | | | 166 | |
| Prep. Ex. 14 | | | | | | | | | | | | | 166 | | | | 166 |
| Prep. Ex. 15 Aminoplast of | 63 | 32 | | 87 | | 112 | 106 | 7 | | | 88 | 188 | | 150 | 100 | | 100 |
| Prep. Ex. 16 Aminoplast of | | | 43 | | 72 | | | | 143 | 29 | | | 63 | | | 57 | |
| Prep. Ex. 17 Titanium dioxide | 150 | 125 | 130 | 170 | | | 230 | 105 | 200 | 120 | 170 | 250 | | | 180 | 140 | |
| 25% soln. of EAB-551-0.2(*1) | | | | | | | | | 80 | 63 | | | | | | | 80 |
| 25% soln. of DN-RS1/4 nitrocellulose(*2) | | | | | | | | 13 | | | | | | | | | |
| Dispersing agent Reybo#3 | 1 | 1 | 1 | 1 | 1 | 1 | | 1 | 1 | 1 | 1 | 1 | | | 1 | 1 | 1 |
| Methyl ethyl ketone/xylol = 6/4 | 15 | 25 | 20 | 20 | | 5 | 132 | 65 | 62 | 25 | 24 | 22 | 4 | 10 | 52 | 0 | 231 |
| 40% p-toluenesulfonic acid soln (in ethanol) | 1.9 | | 9.8 | 21.3 | | 28.5 | 6 | | 10 | 3.6 | | 11.3 | 5.6 | 12.3 | 8.6 | | 10.8 |
| 10% hydrochloric acid soln (in ethanol) | | 12.5 | | | 22.5 | | | 8.4 | | | 34 | | | | | 36.4 | |
| Total | 396.9 | 361.5 | 369.8 | 465.3 | 261.5 | 312.5 | 905.0 | 365.4 | 662.0 | 407.6 | 483.0 | 638.3 | 238.6 | 332.3 | 507.6 | 400.4 | 588.8 |
| Solid content (%) when applied | 75.8 | 69.5 | 71.4 | 74.9 | 58.2 | 64.4 | 62.1 | 58.3 | 65.0 | 63.6 | 71.1 | 80.1 | 65.2 | 69.9 | 72.6 | 70.8 | 35.8 |

Notes:
(*1)EAB-551-0.2 : The trademark of cellulose acetate butylate made by Eastman Chemical Co.
(*2)DN-RS1/4 : The trademark of nitrocellulose made by Daicel Ltd., Japan.

EXAMPLE 18

To the composition of Example 3, 10 parts of titanium lactate was added as an internal catalyst to obtain another coating composition.

EXAMPLE 19

To the composition of Example 12, 22.5 parts of zirconium acetyl acetonate was added as an internal catalyst to obtain another coating composition.

EXAMPLE 20

To the composition of Example 14, 1.5 parts of aluminium alcoholate was added as an internal catalyst to obtain another coating composition.

EXAMPLE 21

To the composition of Example 17, 14 parts of Zirconium acetyl acetonate was added to obtain another coating composition.

The test results of the above examples are also shown in the following Table 3.

The test piece was subjected to flow coating with toluene and the result was observed.

o: Good  ⦿: Whitened slightly  x: Coating was dissolved (5) Water resistance:
The test piece was immersed into water at 20° C. for 4 days and the result was observed.

o: Good  Δ: Blistering (6) Accelerated weather resistance:
Irradiated for 500 hours with a weather-ometer.

(7) Gel fraction:
Calculated from the difference in the weight of coating film before and after the coating film is extracted with acetone.

(8) Yellowing resistance:
After the irradiation with a sterilization lamp for 24 hours, L, a and b were measured by color difference meter to calculate the value ΔE.

(9) Rate of extension:

Table 3

| Test pieces | | Curing Condition | Specular gloss at 60° | Pencil hardness | Gasoline resistance | Toluene resistance | Water resistance | Accelerated weather resistance | Gel fraction (%) | Yellowing resistance (E) | Rate of extension (%) |
|---|---|---|---|---|---|---|---|---|---|---|---|
| Examples | 1 | 60° C. × 30 min | 94 | F | o | o | o | o | 83 | 0.86 | 84 |
| | 2 | 60° C. × 30 min | 93 | F | o | o | o | o | 84 | 0.67 | 86 |
| | 3 | 80° C. × 20 min | 92 | H | o | o | o | o | 92 | 0.76 | 85 |
| | 4 | 80° C. × 20 min | 94 | 2H | o | o | o | o | 90 | 0.66 | 88 |
| | 5 | 80° C. × 15 min | 90 | H | o | o | o | o | 90 | 0.69 | 84 |
| | 6 | 80° C. × 15 min | 93 | F | o | o | o | o | 93 | 0.74 | 83 |
| | 7 | 60° C. × 30 min | 92 | H | o | o | o | o | 86 | 0.82 | 79 |
| | 8 | 60° C. × 30 min | 93 | HB | o | o | o | o | 74 | 0.86 | 76 |
| | 9 | 60° C. × 30 min | 92 | F | o | o | o | o | 78 | 1.92 | 48 |
| | 10 | 60° C. × 20 min | 93 | F | o | o | o | o | 79 | 1.02 | 52 |
| | 11 | 80° C. × 15 min | 91 | HB | o | o | o | o | 88 | 0.96 | 56 |
| | 12 | 60° C. × 30 min | 93 | H | o | o | o | o | 84 | 0.66 | 87 |
| | 13 | 60° C. × 30 min | 95 | F | o | o | o | o | 87 | 0.67 | 92 |
| | 14 | 60° C. × 30 min | 90 | F | o | o | o | o | 92 | 0.82 | 88 |
| | 15 | 80° C. × 20 min | 93 | H | o | o | o | o | 82 | 0.77 | 94 |
| | 16 | 60° C. × 30 min | 91 | H | o | o | o | o | 88 | 0.68 | 90 |
| | 17 | 60° C. × 30 min | 92 | F | o | o | o | o | 90 | 0.82 | 76 |
| | 18 | 60° C. × 20 min | 92 | 2H | o | o | o | o | 89 | 1.07 | 45 |
| | 19 | 60° C. × 15 min | 94 | H | o | o | o | o | 93 | 0.74 | 86 |
| | 20 | 80° C. × 10 min | 93 | 2H | o | o | o | o | 95 | 0.80 | 85 |
| | 21 | 60° C. × 20 min | 93 | 2H | o | o | o | o | 95 | 0.64 | 88 |
| Comp. Ex. | | 80° C. × 30 min | 92 | 2B | x | x | Δ | loss of gloss | 40 | 0.65 | 28 |

| Standards for Evaluation | |
|---|---|
| o : Good | ⦿ : Slightly bad |
| Δ : Bad | x : Very bad |

TEST METHODS (1) Specular gloss:
JIS K-5400.6.7

(2) Pencil hardness:
JIS K-5400.6.14

(3) Gasoline resistance:
A waste cloth was moistened with regular type gasoline and the coating was wiped with it 20 times, the result of which was then observed.

o: Good  ⦿: Whitened slightly  x: Coating was dissolved (4) Toluene resistance:

Measured by extensiometer.

From the foregoing test results, it will be understood that the coating films obtained in accordance with the present invention are excellent in several properties as compared with the conventional ones.

It should be emphasized, however, that the specific examples described and shown herein are intended as merely illustrative and in no way restrictive of the invention.

What is claimed is:

1. A low temperature curing high solid coating composition which consists essentially of:
   (I) 100 parts by weight of acrylic resin having a glass transition temperature of −21° to −50° C. and a hydroxyl value of 40 to 280, which is the copolymerization product of a monomer mixture of acrylic or methacrylic esters having an alkyl group having 1 to 12 carbon atoms and up to less than 15% by weight of acrylic acid or methacrylic acid;

(II) 5 to 160 parts by weight of a 1 to 4 carbon atom monohydric alcohol etherified aminoformaldehyde resin; and (III) 0.5 to 6.0 parts by weight to 100 parts by weight of solid content of the above resin mixture of the items (I) and (II) of acid catalyst.

2. The low temperature curing high solid coating composition as claimed in claim 1, in which not more than 50% by weight of said acrylic ester and/or methacrylic ester are replaced with a polymerizable vinyl monomer or monomers.

3. The low temperature curing high solid coating composition as claimed in claim 1, containing at least one cellulose derivatives or metallic coordination compounds of titanium, zirconium or aluminium.

4. The low temperature curing high solid coating composition as claimed in claim 1 in which said acrylic ester or methacrylic ester is at least one member selected from the group consisting of methyl methacrylate, ethyl methacrylate, butyl methacrylate, isobutyl methacrylate, methyl acrylate, ethyl acrylate, butyl acrylate, isobutyl acrylate, 2-ethylhexyl acrylate, lauryl methacrylate, 2-ethylhexyl methacrylate, 2-hydroxyethyl methacrylate, 2-hydroxyethyl acrylate, hydroxypropyl acrylate, glycidyl acrylate and glycidyl methacrylate.

5. The low temperature curing high solid coating composition as claimed in claim 1 in which the amino component of said amino-formaldehyde resin is at least one member selected from the group consisting of melamine, urea, benzoguanamine, acetoguanamine, steroguanamine and spiroguanamine, and said monohydric alcohol is at least one member selected from the group consisting of methyl alcohol, ethyl alcohol, propyl alcohol, isopropyl alcohol, butyl alcohol and isobutyl alcohol.

6. The low temperature curing high solid coating composition as claimed in claim 1 in which said acid catalyst is at least one member selected from the group consisting of hydrochloric acid, phosphoric acid, dimethyl phosphate, xylenesulfonic acid, toluenesulfonic acid, sulfanilic acid, sulfobenzoic acid, naphthalenesulfonic acid, benzenesulfonic acid, sulfosalicylic acid, ethanesulfonic acid, aminophenolsulfonic acid and aminobenzenesulfonic acid.

7. The low temperature curing high solid coating composition as claimed in claim 2, in which said polymerizable vinyl monomer is at least one member selected from the group consisting of styrene, acrylamide and vinyltoluene.

8. The low temperature curing high solid coating composition as claimed in claim 3, in which said metallic coordination compound is at least one member selected from the group consisting of titanium lactate, titanium ammonium lactate, titanium acetyl acetonate, titanium triethanol aminate, titanium octylene glycolate, titanium triisostearate, titanium diacrylate, zirconium ammonium lactate, zirconium acetyl acetonate and aluminium alcoholate.

9. The low temperature curing high solid coating composition as claimed in claim 1, in which the solids content is 63.6–80.1%, said acrylic resin has a molecular weight of about 5000–50,000 as measured by gel permeation chromatography and the amount of said aminoformaldehyde resin is 15–120 parts.

10. The low temperature curing high solid coating composition as claimed in claim 3 wherein said solids content is 63.6%–80.1%, the molecular weight of said acrylic resin is about 10,000–40,000 measured by gel permeation chromatography, the amount of said aminoformaldehyde resin is 15–120 parts, the amount of cellulose derivatives is 1–15 parts per 100 solids of I and II, and the amount of said metallic coordination compounds is 0.1–20 parts per 100 solids of I and II.

11. The low temperature curing high solid coating composition as claimed in claim 9 wherein said acrylic resin is the polymerization product of n-butyl acrylate, styrene and 2-hydroxy ethylacrylate having a molecular weight of about 30,000, a hydroxyl value of 145 and a glass transition temperature of about −37° C. and said amino-formaldehyde resin is a melamine formaldehyde resin etherified by isobutanol.

* * * * *